United States Patent [19]

Greer

[11] E Patent Number: Re. 33,687

[45] Reissued Date of Patent: Sep. 10, 1991

[54] AUXILIARY AIR CONDITIONING, HEATING AND ENGINE WARMING SYSTEM FOR TRUCKS

[75] Inventor: J. Rex Greer, Fort Sumner, N. Mex.

[73] Assignee: Pony Pack, Inc., Fort Sumner, N. Mex.

[21] Appl. No.: 327,036

[22] Filed: Mar. 22, 1989

Related U.S. Patent Documents

Reissue of:

[64] Patent No.: 4,682,649
Issued: Jul. 28, 1987
Appl. No.: 869,607
Filed: Jun. 2, 1986

[51] Int. Cl.[5] ..... F02N 17/06; B60H 1/32

[52] U.S. Cl. ..... 165/43; 62/236; 62/244; 123/142.5 R; 180/69.6; 180/89.1

[58] Field of Search ..... 180/69.6, 89.1; 62/127, 62/323, 239, 244, 196.4, 236; 123/142.5 R; 165/42, 43

[56] References Cited

U.S. PATENT DOCUMENTS

| | | | |
|---|---|---|---|
| 1,974,907 | 9/1934 | Worth | 123/142.5 R X |
| 1,992,568 | 2/1935 | Connor | 123/142.5 R |
| 2,070,615 | 2/1937 | Plante | 123/142.5 R X |
| 2,115,472 | 4/1938 | Sargent | 62/236 X |
| 2,155,776 | 4/1939 | Starr | 123/142.5 R X |
| 3,373,728 | 3/1968 | Collins | 123/142.5 R |
| 3,844,130 | 10/1974 | Wahnish | 62/236 X |
| 4,382,463 | 5/1983 | Ikebukuro | 165/43 X |
| 4,424,775 | 1/1984 | Mayfield, Jr. et al. | 123/142.5 R |
| 4,448,157 | 5/1984 | Eckstein et al. | 123/142.5 R |
| 4,531,379 | 7/1985 | Diefenthaler, Jr. | 165/43 X |

*Primary Examiner*—Richard A. Bertsch
*Attorney, Agent, or Firm*—Birch, Stewart, Kolasch & Birch

[57] ABSTRACT

A small lightweight auxiliary power plant including an engine, electrical alternator, water pump, air conditioning compressor and a heat exchanger is mounted at a convenient location on the tractor of a truck or other large vehicle. The main engine of the truck operates the existing truck air conditioning and heating system in a normal manner when the main engine is running. When the main engine of the truck is not operating and the smaller engine of the auxiliary power plant is operating, the truck air conditioning and heating system is operated by the auxiliary power plant. The heat exchanger of the auxiliary power plant then utilizes the heat of exhaust gases generated by the auxiliary power plant engine to warm the truck engine during the time it is not operating so that easy starting of the truck engine is made possible even in very cold regions. The electrical alternator of the auxiliary power plant supplies electrical power for the truck electrical system when the truck engine is not running. The truck storage batteries serve the electrical systems of the truck and the auxiliary power plant. The auxiliary power plant serves as an emeergency back-up system if the truck alternator or compressor should fail. The arrangement reduces air pollution caused by operation of the truck engine for long periods of time while the truck is stopped. Provision can be made for warming the fuel tanks and fuel lines to prevent fuel gelling in cold climates.

23 Claims, 3 Drawing Sheets

AUXILIARY AIR CONDITIONING, HEATING AND ENGINE WARMING SYSTEM FOR TRUCKS

Matter enclosed in heavy brackets [ ] appears in the original patent but forms no part of this reissue specification; matter printed in italics indicates the additions made by reissue.

BACKGROUND OF THE INVENTION

1. Technical Field

This invention relates to air conditioning and heating systems for trucks or other large vehicles, and more particularly relates to an auxiliary power plant which operates in conjunction with the existing air conditioning and heating system of the vehicle and also serves to warm the engine of the vehicle to enable easy starting of the vehicle engine in cold weather.

2. Description of the Prior Art

Auxiliary systems are known in the prior art for heating a vehicle engine and its fuel line while the engine is not operating. Examples of such prior art are present in U.S. Pat. Nos. 3,877,639 and 4,192,457. U.S. Pat. No. 4,454,984 discloses an auxiliary system for heating a truck cab in which the truck storage batteries operate an auxiliary pump.

U.S. Pat. No. 4,531,379 discloses an auxiliary power system for a vehicle air conditioner and heater. The system is designed for an automobile or van. It utilizes a jack shaft assembly equipped with an electromagnetic clutch to transfer power from an auxiliary engine to an existing air compressor of the vehicle when the main engine of the vehicle is not operating.

The objective of the present invention is to improve on the known prior art through provision of an auxiliary power plant for trucks or other large vehicles which is operatively connected with the existing air conditioning and heating system of the vehicle in such a way that the auxiliary power plant can efficiently operate the air conditioning and heating system of the vehicle during such times when the engine of the vehicle is not operating. To enable this, the auxiliary power plant possesses its own engine, alternator, air conditioning compressor, water pump and a heat exchanger which includes heating coils connected in the water cooling circuit of the vehicle main engine and being in heat exchange relationship with the exhaust system of the engine of the auxiliary plant.

A further important object of the invention is to provide in an auxiliary power plant of the type mentioned means for warming the main engine of the truck or other large vehicle when such main engine is not operating, to thereby render easy the starting of the main engine in cold weather after long periods of idleness.

Another important object of the invention is to provide an auxiliary power plant whose dimensions do not exceed approximately 18"×18"×24" and whose weight including its frame does not exceed approximately 200 pounds, thus enabling the power plant to be installed conveniently at available locations on different makes and models of trucks.

Other features and advantages of the invention will become apparent to those skilled in the art during the course of the following description.

As used herein, the word "truck" is not to be taken in a limiting sense, and is intended to apply to any large vehicle, such as a bus, road building equipment, or a mililary vehicle.

DETAILED DESCRIPTION

Figure 1:
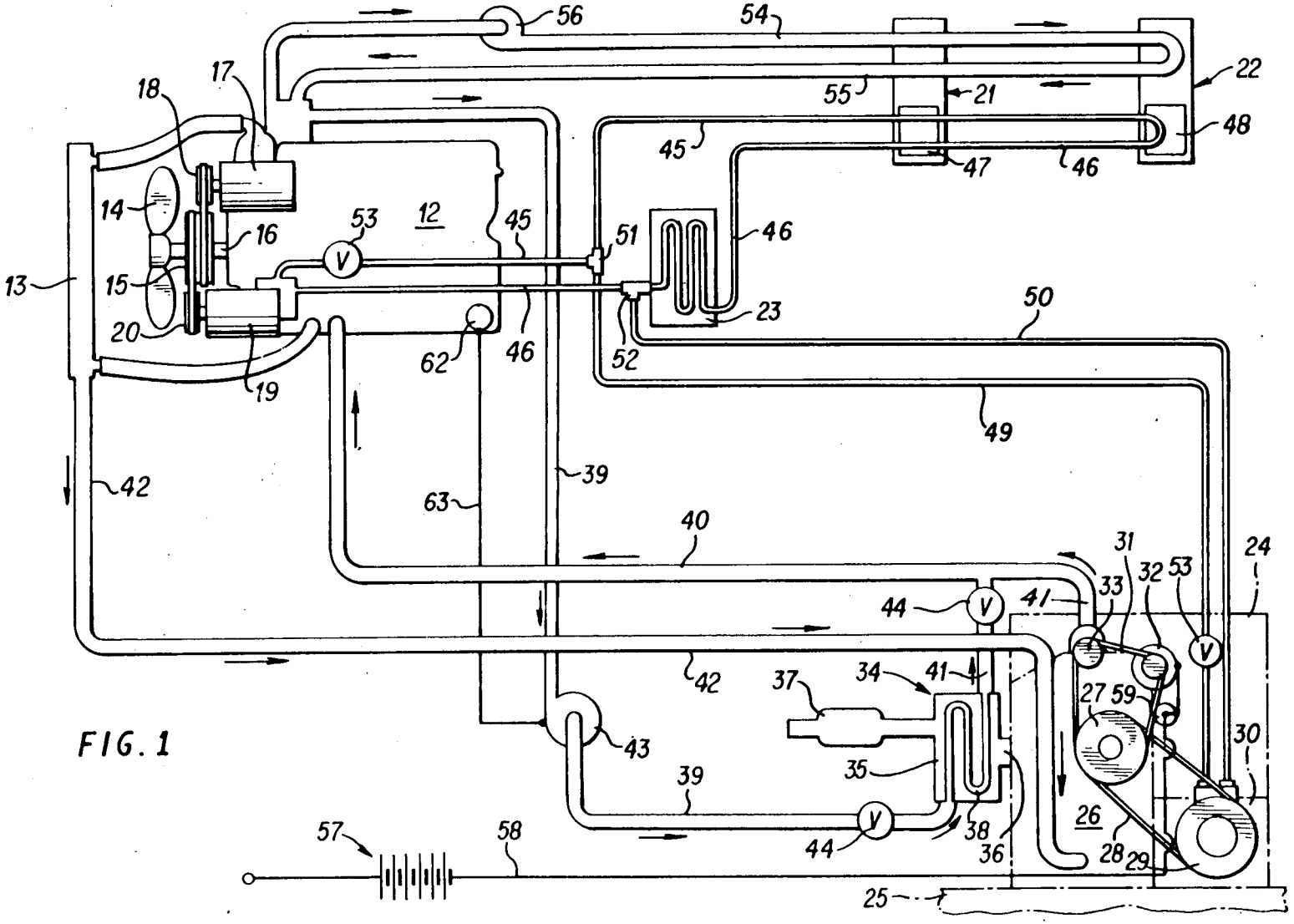
FIG. 1 is a schematic side elevation of a truck air conditioning and heating system and an auxiliary power plant for such system according to the present invention.

Referring to the drawings in detail wherein like numerals designate like parts, a conventional semi-trailer truck includes a tractor 10 having a compartment 11 for the truck engine 12, such as diesel engine. The truck engine is equipped with a radiator 13, behind which is located the usual fan 14 driven by a pulley means 15 on the engine crank shaft 16. A truck alternator 17 is operated by a drive belt and pulley 18 driven by the pulley means 15. Similarly, a truck air conditioning compressor 19 is operated by a belt and pulley 20 driven by the pulley means 15.

The truck cab is equipped with a dash-mounted conventional ac/heater unit 21, and a separate ac/heater unit 22 is provided in the sleeping compartment of the truck tractor. The truck air conditioning condenser 23 may be grill or roof mounted, as found desirable. When grill mounted, an electric temperature controlled fan, not shown, is added to cool the condenser while the vehicle is stationary, or the truck engine fan 14 can be replaced by a full electric fan.

An auxiliary power plant 24 forming the principal subject matter of the invention includes a suitable supporting and unitizing frame, and may be mounted at any convenient location on the truck tractor, such as behind the cab on the tractor main frame, or in the location of the customary cab step.

The auxiliary power plant 24 comprises a small engine 26 such as a Kubota diesel engine or an equivalent engine. The engine 26 drives a crank shaft pulley 27, connected through a belt 28 with a pulley 29 of the power plant compressor 30. Another belt 31 driven by the crank shaft pulley 27 drives a power plant alternator 32, and also drives a power plant water pump 33.

A power plant heat exchanger 34 includes a chamber 35 receiving hot exhaust gases from an exhaust port 36 of the power plant engine 26. From the chamber 35, the spent exhaust gases pass to a muffler 37, which, for added safety, is preferably connected into the customary vertical exhaust stack 37' of the truck tractor 10, FIG. 2.

Within the chamber 35, the heat exchanger 34 includes heat exchanger coils 38 preferably formed of copper and being of any thermally efficient shape, such as wide, flat, thin coils.

A preferably insulated conduit 39 leads from the water jacket of the truck engine 12 to the inlet end of the heat exchanger coil 38 and another insulated conduit 40 leads from the outlet end of the heat exchanger coil back to the water jacket of truck engine 12. A branch conduit 41 interconnects the power plant water pump 33 with the water return conduit 40. Another preferably insulated conduit 42 leads from the truck radiator 13 to the water jacket of the power pant engine 26.

A water circulating pump 43 is connected in the conduit 39 and pulls water from one side of the truck engine 12, pumping it through the power plant heat exchanger coil 38 and back through the conduit 40 to the other side of the truck engine.

One-way check valves 44 are installed in the conduits 39 and 40 near the opposite ends of the heat exchanger coil 38. When the circulating pump 43 is off, the check valves 44 allow the heat exchanger 34 to boil dry, thereby stopping the heat transfer process by preventing any back-flow of water through the lines 40 and 39.

Air conditioning pressure lines 45 and 46 lead from the truck compressor 19 serially through the truck cab and sleeper compartment ac units 47 and 48, each having their own controls, and from these units back to the truck compressor 19. The return refrigerant line 46 has the condenser 23 connected therein immediately before the T-fitting 52 also connected with the return refrigerant line 50.

Auxiliary air conditioning pressure lines 49 and 50 lead from and to the power plant compressor 30 and are connected by T-fittings 51 and 52 with the truck air conditioning pressure lines 45 and 46, respectively. Cut-off valves 53 are placed in the lines 45 and 49 leading from the two compressor 19 and 30. Automatic pressure-actuated one-way cut-off valves are preferred, although electric valves or even manual valves can be used to assure the flow of freon in one direction only. The valves 53 are critical to the operation of the system having the two compressors 19 and 30.

Existing truck heater hoses 54 and 55 extend to and from the truck engine water cooling system and pass serially through the truck cab dash-mounted and sleeper compartment heater units having their own heater controls, as shown. A circulating pump 56 is connected in the heater hose 54, with a control switch on the power plant panel, not shown, which control panel can be located at any convenient point on the truck. The power plant control panel is wired into the truck electrical system so that the power plant alternator 32 charges the existing truck storage batteries 57, which are the only batteries employed in the entire system. When the truck engine 12 is not operating, the power plant alternator 32 operates the total electrical system embodied in the invention.

A cable 58 interconnects the truck storage batteries with the starter 59 of power plant engine 26. The starter is conventional. A temperature-responsive on-off switch 62 of the type commonly used for fans is provided for the control of circulating pump 43 and is connected therewith by a conductor 63. The switch 62 is in thermal contact with the truck engine 12. In lieu of the thermal switch 62, a manual on-off switch could be used to turn off the circulating pump 43 when the desired temperature of the truck engine 12 is reached while such engine is not running.

Operation

When the truck engine 12 is running, as when the truck is traveling or stopped for a short time period only, the truck air conditioning and heating systems operate in a conventional manner to supply conditioned air or warm air to the truck cab and/or sleeping compartment through the individually controllable units 21 and 22. At this time, the auxiliary power plant including its small engine 26 is inactive and has no effect on the operation of the truck air conditioning and heating systems or its electrical system.

When the truck stops for a lengthy period and its engine 12 is shut off, the operation of the truck alternator 17 and compressor 19 of course ceases. At this time, the auxiliary power plant 24 is activated by starting its relatively small engine 26, which activates the alternator 32, water pump 33 and the compressor 30 whenever air conditioning of the truck cab and/or sleeping compartment is demanded. When it is demanded, the connections of the pressurized freon lines 49 and 50 through the T-fittings 51 and 52 will supply air conditioning in the same manner that it would ordinarily be supplied by the truck system including the compressor 19.

Simultaneously, the circulating pump 43 constantly draws water from the truck engine water cooling system and pumps it through the coil 38 of the power plant heat exchanger 34 and back to the truck engine, whereby proper heating of the cab and/or sleeping compartment is made available on demand even though the truck engine is not operating.

The heat of the exhaust gases from the power plant engine 26 is utilized to heat the water flowing through the heat exchanger coil 38 in a continuous and efficient manner as long as the small engine 26 operates.

Additionally, the heated water flowing to and from the water jacket of the truck engine 12 through the insulating conduits 40 and 39 maintains the truck engine warm so that it will start quickly even in very cold weather. This added capability of the invention for warming the truck engine while making availble cab and sleeping compartment heating and air conditioning is a very important feature not heretofore available in the prior art. The provision of the additional circulating pump 56 in the existing truck heater conduit system renders the operation of the invention even more efficient. The cut-off valves 53 in the freon pressure lines 45 and 49 are essential to the proper operation of the air conditioning system in accordance with the invention.

It may now be seen that the invention is characterized by convenience and simplicity of construction and operation. Existing components on the truck or other large vehicle are used in the normal manner while the truck engine 12 is operating. When the truck engine is not operating and the auxiliary power plant 24 is in use, existing components of the truck heating and air conditioning systems are still employed and therefore complete duplication of system parts is avoided. Only such parts as are essential to the proper functioning of the truck heating and air conditioning system, and essential to maintaining the truck engine warm while shut off for long periods, are included in the auxiliary power plant 24. These essential components are the small engine 26, alternator 32, compressor 30, heat exchanger 34 and the water pump 33. Throughout the system embodying the invention, conventional commercial shelf components are used almost entirely. The heat exchanger 34 is basically the only customized component of the invention, and the heat exchanger is quite simplified in construction.

Figure 2:
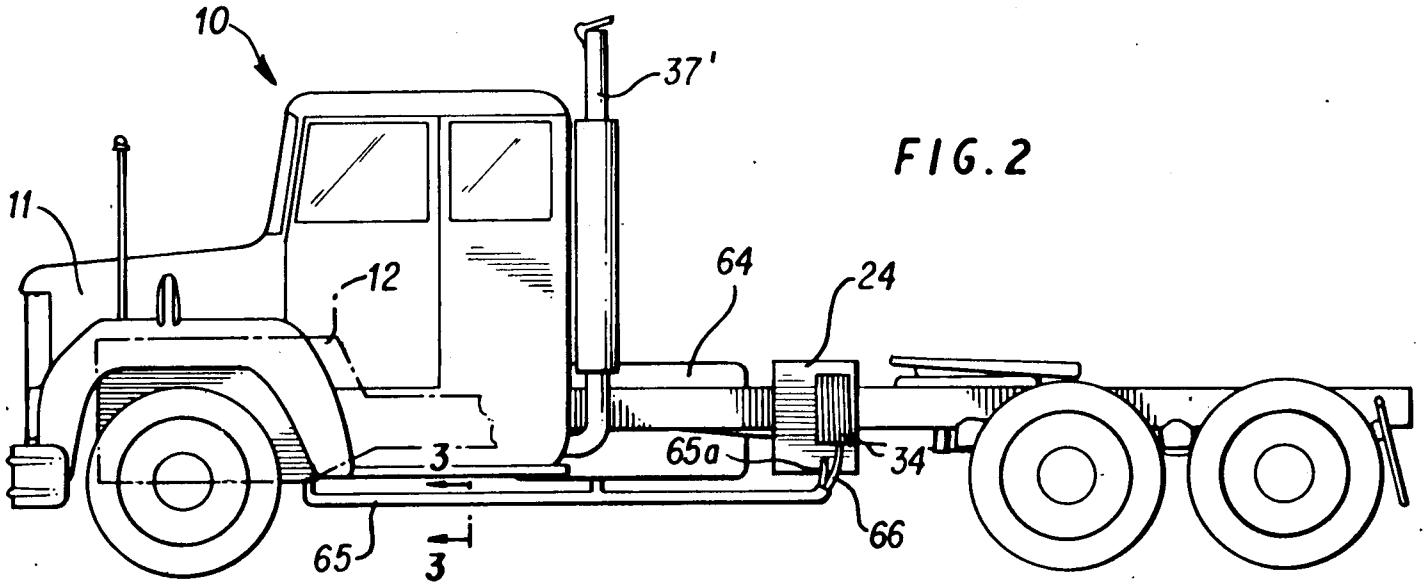
FIG. 2 is a side elevation of a truck tractor having the invention applied thereto.

As shown in FIG. 2, the auxiliary power plant 24, in many cases, can be mounted on the main frame of the tractor 10 behind its fuel tanks 64. The exact location of the power plant 24 will depend on the style or configuration of the particular truck or other large vehicle to which the invention is applied. Because of its lightness and compactness, the auxiliary power plant 24 can easily be installed on practically any large vehicle whether a truck, bus, military vehicle or road building machine.

Figure 3:
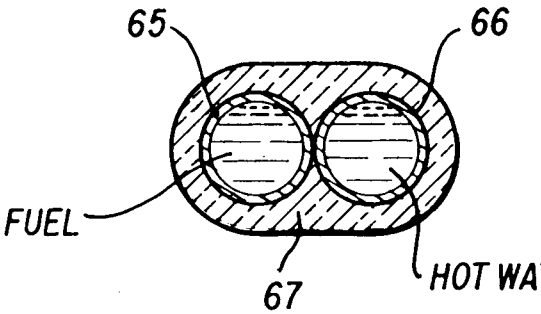
FIG. 3 is an enlarged vertical section taken on line 3—3 of FIG. 2.

A desirable optional feature of the invention where use is contemplated in extremely cold conditions consists of providing a convenient and economical means of warming the fuel lines 65 and 65a extending from the fuel tank or tanks 64 to the truck engine 12 or auxiliary power plant engine 26. This means preferably comprises the provision of a hot water line 66, FIG. 3, extending to or from the heat exchanger 34, FIG. 2, and being placed in thermal contact with the fuel lines 65 and 65a, both lines being jacketed with insulation 67. This arrangement is fully effective in preventing gelling of the diesel fuel even in extremely cold weather. All of the necessary heat is provided by the exhaust of the small engine 26. This heat is more than adequate to warm the truck engine 12 while simultaneously warming the lines feeding fuel to both engines 12 and 26.

Since the fuel lines 65 and 65a are connected with the fuel tank 64 at or near its bottom, there is almost never a problem with gelling of fuel in the tank. However, if desired, some external insulation can be provided on the bottom of the tank 64.

Figure 4:
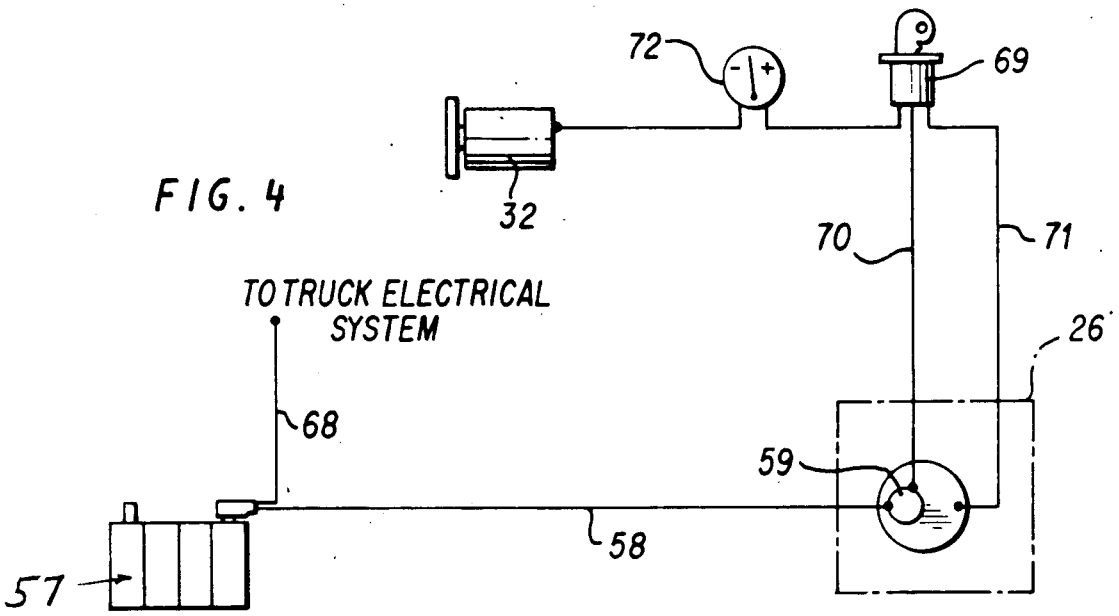
FIG. 4 is a partial schematic view of the truck ignition system as involved in the present system.

Referring to FIG. 4, the truck storage battery means 57 and battery cable 58 leading to the solenoid of the starter 59 for the power plant engine 26 is indicated. Another cable 68 interconnects the storage battery means 57 to the conventional electrical system of the truck, which system need not be illustrated in detail. The conventional truck ignition switch 69 has one terminal thereof connected with a conductor 70 leading to the starter solenoid 59 of power plant engine 26, the conductor 70 being the hot conductor. Another terminal of the ignition switch 69 is connected with a power plant engine starter wire 71. A third terminal of the switch 69 interconnects that switch with the power plant alternator 32 through a conventional ammeter 72.

Figure 5:
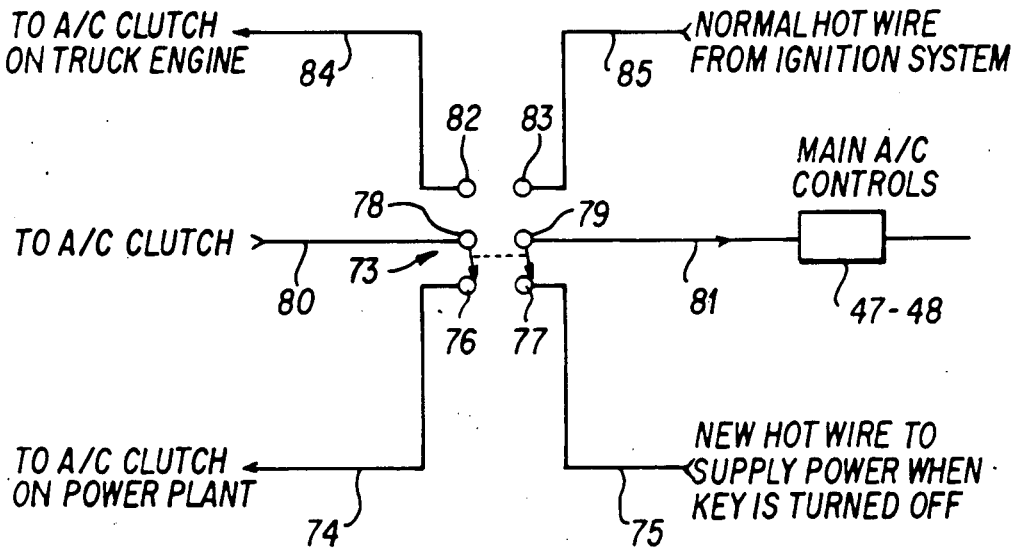
FIG. 5 is a schematic view showing terminals of a dash mounted switch and associated elements.

A dash-mounted, preferably key operated, double pole double throw (DPDT) switch 73, FIG. 5, separate from the truck ignition switch 69 is provided. Conductors 74 and 75 extend from terminals 76 and 77 of the switch 73, respectively, to the electric clutch of the power plant air conditioning compressor 30 and to form a new hot wire to supply power when the truck ignition key is turned off.

Terminals 78 and 79 of the switch 73 are connected through conductors 80 and 81 to the electric clutch of truck compressor 19 and to the controls of the truck air conditioning units 47 and 48. Terminals 82 and 83 of the switch 73 are connected, respectively, to a conductor 84 leading to the clutch of truck compressor 19, and to a conductor 85 which is the normal hot wire from the truck ignition system to the switch 73.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. An air conditioning, heating and engine warming system for trucks and like vehicles comprising:

an engine including a block connected to a radiator;

an engine and truck air conditioning and heating system including a truck compressor, a condenser, refrigerant lines extending from the truck compressor to at least one air conditioning unit and extending from the air conditioning unit to the condenser and back to the truck compressor, and heater conduits extending from the engine block to at least one heating unit and extending back to the engine block;

an auxiliary power plant on the truck including an auxiliary engine, alternator, coolant system including a water pump and an air conditioning compressor each driven by the auxiliary engine, and a heat exchanger having a chamber located immediately adjacent the auxiliary engine for receiving hot exhaust gases therefrom and having a liquid heating coil within said chamber in heat transfer relationship with the exhaust gases, a first coolant conduit coupled from the engine block to one side of the heating coil of the heat exchanger and a second coolant conduit coupled directly back to the engine block, said second coolant conduit being additionally coupled to the other side of said heating coil, a circulating pump connected in the first conduit between the engine block and the heating coil;

the return of heated water to the engine block from said second conduit acting to warm the engine block and thus aid starting of the truck engine in cold weather when the auxiliary power plant is operated;

additional refrigerant lines coupling the compressor of the auxiliary power plant to refrigerant lines connecting said air conditioning unit and said condenser whereby refrigerant can be independently supplied to the truck air conditioning system from the compressor of the auxiliary power plant when said auxiliary power plant is operated; and means in the refrigerant lines between the truck compressor and said one air conditioning unit and between the compressor of the auxiliary power plant and said one air conditioning unit for restricting back flow of refrigerant between the two said compressors.

2. In an air conditioning and heating system as defined in claim 1, wherein said means for restricting back flow comprise automatic pressure-actuated cut-off valves.

3. In an air conditioning and heating system as defined in claim 1, and additionally including a third coolant conduit coupled from said radiator to the coolant system of the auxiliary engine and through the water pump thereof, and a fourth coolant conduit coupled from said water pump directly back to the engine block, the return of the heated water to the engine block from said fourth conduit also acting to warm the engine block.

4. In an air conditioning and heating system as defined in claim 3, and additionally including means connected in said first and second cooling conduits on either side of the heating coil of said heat exchanger for allowing the heat exchanger to boil dry when the circulating pump is inactive and to prevent undesired back flow through the heating coil from the water pump of said auxiliary power plant.

5. In an air conditioning and heating system as defined by claim 3, and wherein said second and fourth coolant circuits are commonly connected.

6. In an air conditioning and heating system as defined by claim 3, additionally including first and second valve means coupled to opposite sides of said heating coil, said first valve means being further coupled in said first coolant conduit between the circulating pump and the heating coil, and said second valve means being coupled between the heating coil and said second coolant conduit, whereby undesired back flow through the heating coil from said water pump is prevented and the heat exchanger is boiled dry when the circulation pump is turned off.

7. In an air conditioning and heating system as defined in claim 6, wherein said valve means comprise one-way check valves.

8. In an air conditioning and heating system as defined by claim 7, wherein said connecting means comprise a pair of T connectors.

9. In an air conditioning and heating system as defined by claim 1, and additionally including means commonly connecting the refrigerant lines extending from and to the truck compressor and the refrigerant lines extending from and to the compressor of the auxiliary power to the refrigerant lines extending to and from said at least one air conditioning unit and condenser.

10. In an air conditioning and heating system as defined by claim 1, and additionally including a temperature responsive switch in thermal contact with the engine block and being electrically connected to said circulating pump for controlling activation of the pump to maintain the engine at a predetermined temperature when the truck engine is not running.

11. In an air conditioning and heating system defined by claim 1, and including a cab and a sleeping compartment and wherein said at least one air conditioning and heating units are selectively located in either said cab or said sleeping compartment.

12. In an air conditioning and heating system as defined by claim 11, and additionally including another air conditioning unit and another heating unit located in the other said cab or said sleeping compartment, and additionally including refrigerant lines coupling both said air conditioning units in series, and heater conduits coupling both said heating units in series.

13. In an air conditioning and heating system as defined by claim 12, and additionally including separate controls in said cab and said sleeping compartment for independently controlling the heating and air conditioning units at each location.

14. In an air conditioning and heating system as defined by claim 1, wherein said auxiliary engine comprises an internal combustion engine.

15. In an air conditioning and heating system as defined by claim 14, wherein said internal combustion engine comprises a relatively small diesel engine.

16. In an air conditioning, heating and engine warming system as defined in claim 1, and further comprising a vehicle alternator, an auxiliary power plant alternator, a vehicle storage battery, and circuitry coupled to said battery, said circuitry including a vehicle ignition switch and another switch independent of the vehicle ignition switch, said another switch being operable to start the auxiliary engine of the auxiliary power plant when the vehicle ignition switch interrupts the vehicle ignition circuit, said auxiliary power plant alternator being further connected to and operable to charge said battery in place of said vehicle alternator when the auxiliary power plant is operating.

17. In an air conditioning and heating system as defined by claim 1, and additionally including a water line passing through said heat exchanger and being in thermal contact with selected fuel lines of said truck engine and said auxiliary engine for warming said fuel lines in cold weather.

*18. In combination, a truck including a cab, a water cooled primary engine, an air conditioning system including a first compressor driven by said engine, air conditioning means and condenser means, and a heating system operatively connected to the coolant of the engine,*

*an auxiliary engine mounted on said truck and including a second air conditioner compressor driven thereby, condenser means operatively connected to said second compressor,*

*an alternator mounted on and driven by said auxiliary engine, said alternator being operatively connected to the truck's electrical system to supply electricity thereto when said primary engine is not running,*

*means operatively connecting one side of said condenser means to said air conditioning means,*

*means connecting the air conditioning means to said second air conditioner compressor,*

*and control means for selectively supplying refrigerant from either said second compressor or said first compressor to said air conditioning means whereby the interior of said cab may be cooled without operating the engine of said truck.*

*19. The combination of claim 18 wherein said auxiliary engine is water cooled and wherein means fluidly connects the coolant in said auxiliary engine to said heating system whereby the hot coolant water in said auxiliary engine may be supplied to said heating system to provide heat to the interior of said cab without operating the truck engine.*

*20. The combination of claim 19 wherein means is provided for further heating the coolant water by said auxiliary engine.*

*21. The combination of claim 19 wherein the hot coolant water from the auxiliary engine also heats the fuel in the truck fuel tank.*

*22. A truck including a cab, comprising:*

*a water-*cooled primary engine including a radiator for cooling fluid moving through the water jacket of the engine,

*a heating system for heating the interior of the cab including heater unit means operatively connected to the hot fluid moving through the water jacket,*

*an auxiliary water-cooled engine mounted on said truck,*

*an alternator mounted on and driven by said auxiliary engine, said alternator being operatively connected to the truck electrical system to supply electricity thereto when said primary engine is not running,*

*means fluidly connecting the coolant water of said auxiliary engine to said heater unit means to selectively supply hot coolant water from said auxiliary engine to said heater unit means when said primary engine is not running, whereby said auxiliary engine will provide heat to the interior of said cab without operating said primary engine.*

*23. The apparatus of claim 22 wherein means is provided for further heating the coolant water by said auxiliary engine.*

* * * * *